United States Patent [19]

Erickson

[11] Patent Number: 4,582,041
[45] Date of Patent: * Apr. 15, 1986

[54] INSULATED BARBEQUE UNIT

[75] Inventor: Frederick J. Erickson, Des Moines, Iowa

[73] Assignee: Ehco, Inc., Marshalltown, Iowa

[*] Notice: The portion of the term of this patent subsequent to Dec. 6, 2000 has been disclaimed.

[21] Appl. No.: 677,507

[22] Filed: Dec. 3, 1984

[51] Int. Cl.⁴ .................. A47J 37/00; F24C 1/06
[52] U.S. Cl. .................... 126/9 R; 126/25 R
[58] Field of Search ............ 126/25 R, 25 A, 25 B, 126/9 R, 9 A, 9 B; 99/449, 450, 339, 340

[56] References Cited

U.S. PATENT DOCUMENTS

| | | | |
|---|---|---|---|
| 1,533,494 | 4/1925 | Billsburg | 126/9 R |
| 2,477,529 | 7/1949 | Sprinkle et al. | 126/9 R |
| 2,515,521 | 7/1950 | Loffredo | 126/9 B |
| 2,746,378 | 5/1956 | Lang | 126/9 A |
| 2,874,631 | 2/1959 | Cooksley | 126/9 B |
| 2,910,059 | 10/1959 | Gehne | 126/9 B X |
| 2,983,269 | 5/1961 | Montesano | 126/25 R |
| 2,994,316 | 8/1961 | Brender | 126/9 R |
| 2,999,494 | 9/1961 | Richardson | 126/25 R |
| 3,013,549 | 12/1961 | Sexton, Jr. | 126/9 R |
| 3,179,104 | 4/1965 | Chapman et al. | 126/9 R |
| 3,297,017 | 1/1967 | Levin | 126/9 R |
| 3,306,280 | 2/1967 | Vannoy | 126/25 R |
| 3,306,281 | 2/1967 | Stoebel | 126/25 R |
| 3,478,733 | 11/1969 | Meyerhoefer | 126/25 R |
| 3,487,199 | 12/1969 | Hamlin | 126/25 R |
| 3,611,912 | 10/1971 | Choc | 126/9 R |
| 3,692,013 | 9/1972 | Gratton et al. | 126/25 R |
| 3,791,368 | 2/1974 | Hunt | 126/9 R |
| 3,911,892 | 10/1975 | Harris | 126/9 R |
| 4,046,132 | 9/1977 | White | 126/25 B |
| 4,069,806 | 1/1978 | Landry | 126/9 R |
| 4,126,116 | 11/1978 | McCallum | 126/9 R |
| 4,133,335 | 1/1979 | Malafouris | 126/9 R |
| 4,418,678 | 12/1983 | Erickson | 126/9 R |

Primary Examiner—Margaret A. Focarino
Assistant Examiner—Helen Ann Odar
Attorney, Agent, or Firm—Zarley, McKee, Thomte, Voorhees & Sease

[57] ABSTRACT

The insulated barbeque unit of the present invention is comprised of a rectangular box which is formed from two rectangular half boxes hinged along one of their edges. The unit can fold from a closed position wherein the two box halves are in the form of an enclosed rectangular box, to an open position wherein the two box halves are pivoted 180° with respect to one another. The housing of the unit is formed from two spaced apart inner and outer walls which have insulative material therebetween. Foldable legs are attached to the device and may be moved from a stored position within the rectangular box to an operative position wherein they support the box in spaced relation above the supporting surface.

3 Claims, 6 Drawing Figures

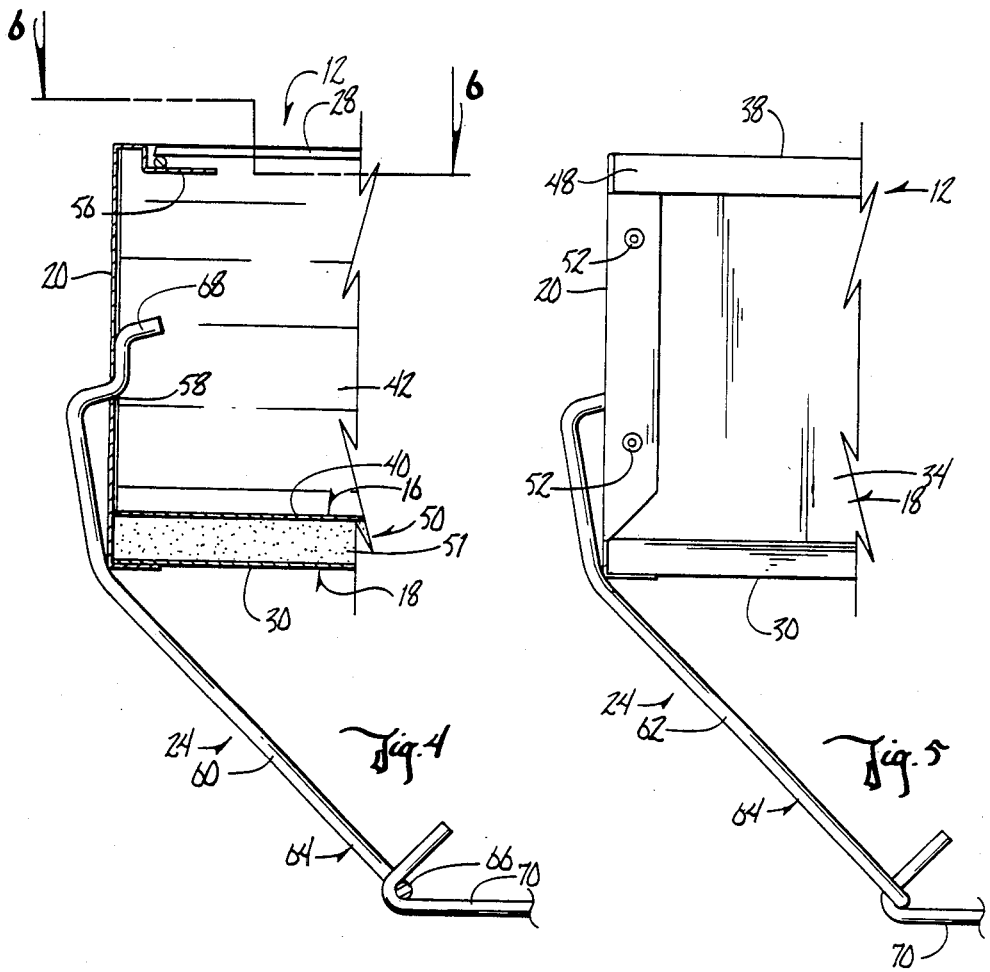
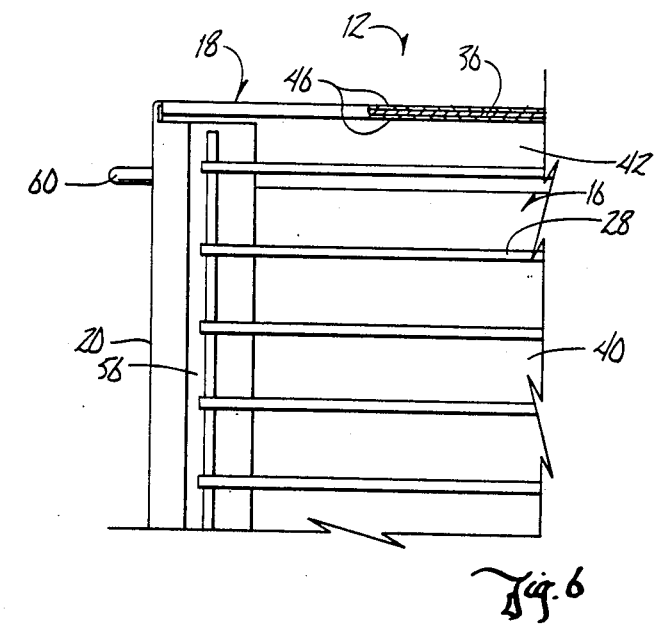

INSULATED BARBEQUE UNIT

BACKGROUND OF THE INVENTION

This invention relates to an insulated barbeque unit. Various types of folding barbeque untis have been utilized, and many of these have included a painted design on the outer surface thereof. The painted design may be utilized for advertising or for mere decoration.

One problem encountered with these units is that after extended use the heat from the charcoal within the unit causes the paint on the exterior of the unit to be peeled and to come off. This makes the unit less desirable from the standpoint of either decorating the exterior surface or from the standpoint of using the exterior surface for advertising.

Therefore, a primary object of the present invention is the provision of an improved barbeque unit having insulated walls therein.

A further object of the present invention is the provision of an insulated barbeque unit which provides the maximum insulation at the point where the maximum heat is located during the time the barbeque unit is being used.

A further object of the present invention is the provision of a barbeque unit which can be easily folded and carried.

A further object of the present invention is the provision of an improved barbeque unit which can be folded into an attractive shape that can be painted on the exterior for advertising or decoration.

A further object of the present invention is the provision of a barbeque unit which includes foldable legs which may be stored within the unit for transporting the unit, and which may be folded outwardly to support the unit when in use.

A further object of the present invention is the provision of a barbeque unit which is economical to manufacture, durable in use, and efficient in operation.

SUMMARY OF THE INVENTION

The present invention utilizes a pair of half rectangular boxes which are hinged along one of their edges so they can fold from an open position wherein their upper surfaces form a continuous plane to a closed position wherein their upper surfaces are in facing relation and the two half boxes together combine to form an enclosed rectangular box.

The walls of the present invention are of double thickness, including an inner wall and an outer wall which are separated by an insulative layer. In cross section, the insulative layer is thickest at the bottom, and tapers inwardly to a point adjacent the upper edges of the box side walls. Since the charcoal within the unit rests on the bottom wall of the device, the maximum insulation is applied at the point where the maximum heat is encountered. The insulative material protects the outer surface of the device from the heat of the charcoal within so that the paint on the outer surface will not become peeled, blackened or blistered due to the heat from the inside.

The ends of the two half boxes are each provided with vent openings. Folding legs are also mounted on the end walls of the device, and are adapted to unfold to a position wherein they support the two box halves on a supporting surface when the box halves are opened to their open position.

BRIEF DESCRIPTION OF THE FIGURES OF THE DRAWINGS

FIG. 4 is a sectional view taken along line 4—4 of FIG. 3.

FIG. 5 is a sectional view taken along line 5—5 of FIG. 3.

FIG. 6 is a sectional view taken along line 6—6 of FIG. 4.

DETAILED DESCRIPTION OF THE PREFERRED EMBODIMENT

Figure 1:
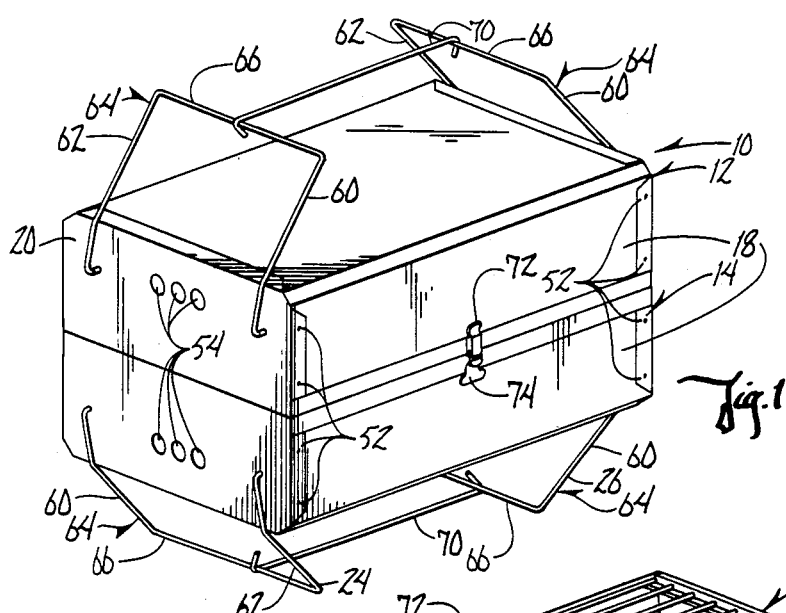
FIG. 1 is a perspective view of the present invention in its folded condition.

The numeral 10 generally refers to the barbeque grill of the present invention. Grill 10 comprises a first box half 12 and a second box half 14. Box halves 12 and 14 are substantially identical in construction and include an inner wall 16, an outer wall 18, end walls 20, 22, foldable legs 24, 26, and a grill 28. Outer wall 18 includes a bottom portion 30 and two vertical portions 32, 34, each of which terminate in an upper edge 36, 38 respectively.

Inner wall 16 comprises a bottom portion 40, and vertical portions 42, 44, each of which terminate in upper edges 46, 48, respectively, which are folded over the upper edges 36, 38 of outer wall 18.

Figure 3:
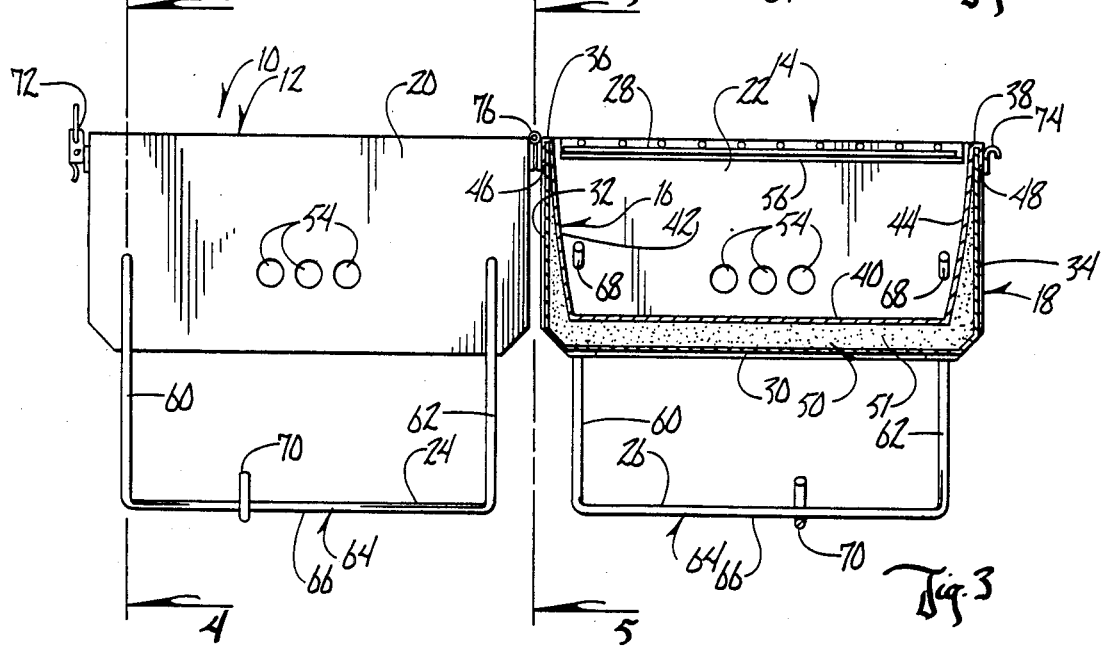
FIG. 3 is a sectional view taken along line 3—3 of FIG. 2.

The folded over edges 46, 48 are pressed tightly over the upper edges 36, 38 so as to secure inner wall 16 to outer wall 18 with inner wall 16 being in upwardly spaced relation thereto at all points along it surface except for the upper edges 46, 48. As can be seen in FIG. 3, the upstanding walls 42, 44 of inner wall 16 are slanted so that they are spaced a greater distance from outer wall 18 at their lower ends. The greatest distance between inner wall 16 and outer wall 18 is adjacent the lower ends of side portions 42, 44 and adjacent the bottom wall 40. This insures that the greatest insulative effect will be provided adjacent the bottom wall 40 where the charcoal briquettes will be placed. The space between inner wall 16 and outer wall 18 is designated by the numeral 50 and this space or cavity 50 is filled with an insulation material so as to insulate the inner and outer walls 16, 18 from one another. The preferred material for use in cavity 50 is vermiculite, but other materials may be used. The insulative material should be non-combustible.

End walls 20, 22 are attached across the ends of outer wall 18, and are secured in position by means of rivets or screws 52, or other conventional securing means. End walls 20, 22 each include a plurality of vent openings 54 for permitting air and oxygen to enter the area immediately above bottom portion 40 of inner wall 16. The upper edges of end walls 20, 22 are bent over into a horizontal flange 56 (FIGS. 4–6). Resting on flanges 56 and spanning the distance between end walls 20, 22 is grate or grill 28.

Figure 2:
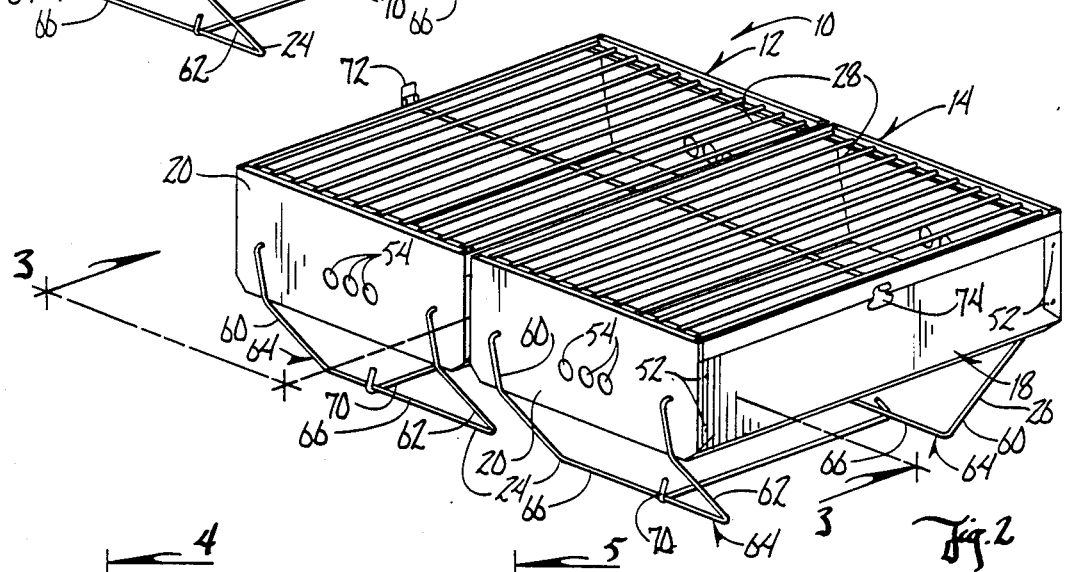
FIG. 2 is a perspective view of the present invention in its unfolded operative position.

Each end wall 20, 22 is provided with a pair of leg receiving openings 58 through which are inserted the legs 60, 62 of a U-shaped support 64 having a horizontal member 66 which interconnects legs 60, 62. Each leg 60, 62 includes at its upper end a bent foot 68 which limits the outward sliding movement of legs 60, 62 within leg receiving openings 58. The leg 60, 62 may be extended outwardly to their position shown in FIGS. 2 and 3, or they may be moved inwardly within openings 58 until the legs 60, 62 are substantially within the boxes 12, 14, with only the cross bar 66 being exposed to the outside of boxes 12, 14.

In order to hold legs 50, 62 in their operative position, a hook member 70 interconnects the two U-shaped legs 64 at the opposite ends of each box.

A pair of hinges 72 pivotally interconnect boxes 12, 14, and are attached to the upper edges of outer walls 18. The hinges 72 permit box 12 to be pivoted about a horizontal axis with respect to box 14 from the position shown in FIGS. 2 and 3, to the position shown in FIG. 1. As can be seen in FIG. 1, box halves 12 and 14 together form a rectangular box. In this position, the cross bars 70 may be be utilized as a handle for carrying the device. Alternatively, hooks 70 can be removed and the U-shaped support members 64 can be slid into the boxes 12 and 14, leaving only the cross bars 66 exposed outside the box halves 12, 14. A first latch member 72 is carried on box half 12 and a second latch member 74 is mounted on box half 14. As can be seen in FIG. 1, these latch members 72, 74 are positioned adjacent one another and may be latched together to hold the two box halves 12 and 14 in the position shown in FIG. 1 for transporting. In this position, the device can also be used for smoking or cooking various types of foods.

The outer surfaces of the box halves 12, 14 are insulated from the heat from the fire and coals within cylinder halves 12, 14. The insulative material within the space or cavity 50 helps provide this insulative effect. Consequently, the outer surface of outer wall 18 may be painted, either for decoration or for advertising on the outer surface of the device. The device is compact, and can be folded easily. It is sturdy, simple in construction, attractive in appearance, and efficient in operation.

Thus, it can be seen that the device accomplishes at least all of its stated objectives.

What is claimed is:

1. A barbeque unit comprising:
    a rectangular inner wall having opposite end edges, and opposite side edges extending upwardly and being spaced apart from one another so as to form an upwardly presented surface and a downwardly presented surface;
    a rectangular outer wall having opposite end edges, and opposite side edges extending upwardly and being spaced apart from one another so as to form an upwardly presented surface and a downwardly presented surface:
    connecting means joining said spaced apart side edges of said inner wall to said spaced apart side edge of said outer wall and holding said inner and outer walls together in nesting relationship with at least a portion of said downwardly presented surface of said inner wall being spaced from at least a portion of said upwardly presented surface of said outer wall to define a cavity therebetween;
    heat insulating material filling said cavity whereby heat from coals resting on said upwardly presented surface of said inner wall will be substantially insulated from said outer wall;
    grate means extending between said spaced apart opposite side edges of said inner and outer walls and bridging across and above said upwardly presented surface of said inner member;
    a pair of spaced apart end walls each extending in a plane perpendicular to said inner and outer walls and each being joined to one of said end edges of said outer wall to define a fire chamber;
    leg means retractably attached to each of said end walls and being slidable from a first inoperative position within said fire chamber to a second operative position for supporting said inner and outer walls above a supporting surface.

2. A barbeque unit according to claim 1 and further comprising at least one vent hole in at least one of said end walls for providing communication of air from outside said barbeque unit through said one end wall to coals resting on said upwardly presented surface of said inner wall.

3. A barbeque unit comprising:
    a rectangular outer housing wall having a horizontal bottom portion and two upstanding portions extending upwardly from the opposite sides of said bottom portion and terminating in spaced apart upper edges;
    a rectangular inner wall having a horizontal bottom portion and two upstanding portions extending upwardly from the opposite sides of said bottom portion and terminating in spaced apart upper edges;
    connecting means joining said upper edges of said upstanding portions of said inner wall to said upper edges of said upstanding portions of said outer wall so as to hold said inner and outer walls in nesting relationship with said inner wall being spaced from said outer wall so as to define a cavity therebetween;
    heat insulating material filling said cavity whereby heat from coals resting on said bottom portion of said inner wall will be substantially insulated from said outer wall;
    the spaced apart distance between said inner and outer walls being greatest adjacent said bottom portion of said inner wall where said coals rest;
    grate means extending between said spaced apart upper edges of said inner wall and bridging across and above said bottom portion of said inner wall;
    a pair of spaced apart end walls each having upper edges and each extending in a plane perpendicular to said inner and outer walls and each being joined to one of said end edgs of said outer wall;
    said outer wall and said end walls defining a first rectangular housing having an open upper end defined by said upper edges of said upstanding portions of said inner wall and said upper edges of said end walls;
    a second outer wall, a second inner wall, and a second pair of end walls forming a second rectangular housing identical to said first rectangular housing, and
    hinge means connecting one of said upper edges of one said upstanding portions of said first outer wall to one of said upper edges of said upstanding portions of said second outer wall so as to permit said first and second rectangular housings to pivot about a horizontal axis with respect to one another from a joined position wherein said first and second rectangular housings together form an enclosed rectangular box to a spread position approximately 180° therefrom.

* * * * *